(12) United States Patent
Nielsen et al.

(10) Patent No.: US 7,952,519 B1
(45) Date of Patent: May 31, 2011

(54) METHOD AND SYSTEM FOR DETECTING GNSS SPOOFING SIGNALS

(76) Inventors: John Nielsen, Calgary (CA); Ali Broumandan, Calgary (CA); Gerard LaChapelle, Calgary (CA)

(*) Notice: Subject to any disclaimer, the term of this patent is extended or adjusted under 35 U.S.C. 154(b) by 0 days.

(21) Appl. No.: 12/761,823

(22) Filed: Apr. 16, 2010

(51) Int. Cl.
*G01S 3/16* (2006.01)
(52) U.S. Cl. ........................................ 342/378
(58) Field of Classification Search .................. 342/378
See application file for complete search history.

(56) References Cited

U.S. PATENT DOCUMENTS

| | | | | |
|---|---|---|---|---|
| 4,608,569 | A * | 8/1986 | Dickey et al. | 342/384 |
| 5,557,284 | A * | 9/1996 | Hartman | 342/357.29 |
| 5,694,416 | A * | 12/1997 | Johnson | 375/148 |
| 5,952,968 | A * | 9/1999 | McDowell | 342/383 |
| 6,084,540 | A * | 7/2000 | Yu | 342/17 |
| 6,771,214 | B2 * | 8/2004 | Kober et al. | 342/357.29 |
| 6,933,885 | B1 * | 8/2005 | Stockmaster et al. | 342/357.29 |
| 6,952,460 | B1 * | 10/2005 | Van Wechel et al. | 375/350 |
| 7,250,903 | B1 * | 7/2007 | McDowell | 342/357.59 |

OTHER PUBLICATIONS

Hengqing Wen, Peter Yih-Ru Huang, John Dyer, Andy Archinal, John Fagan, "Countermeasures for GPS signal spoofing", University of Oklahoma, Unpublished but cited in Oct. 2008, by Papadimitratos, "Protection and fundamental vulnerability of GNSS", IEEE International Workshop on Satellite and Space Communications.*

Paul Y. Montgomery, Todd E. Humphreys, Brent M. Ledvina, "A Multi-Antenna Defense Receiver-Autonomous GPS Spoofing Detection", Inside GNSS, Mar./Apr. 2009.*
P. Montgomery, T. Humphreys, B. Ledvina, "A multi-antenna defense—receiver autonomous GPS spoofing detection," InsideGNSS Mar./Apr. 2009, pp. 40-461.
Humphreys, T.E., B.Ledvina, M. Psaiki, B. Hanlon, P. Kintner "Assessing the spoofing threat:Development of a portable GPS civilian spoofer," Proceedings of ION GNSS 2008, Institiute of Navigation, Savanna, Georgia, USA, 2008.
S. Lo, D. Delorenzo, P. Enge, D. Akos, P. Bradley, "Signal Aunthentication, a secure civil GNSS for today," inside GNSS Sep./Oct. 2009, pp. 30-39.
A. Broudmandan, J. Nielsen, and G. LaChapelle,"Signal Detection Performance in Rayleigh Multipath Fading Environments with a Moving Antenna," IET signal Processing Journal, accepted for publication, May 2009.
A. Broumandan, J. Nielsen, and G. Lachapelle, "Performance of Narrowband Signal Detection under Correlated Rayleigh Fading based on Synthetic Array," International Journal of Antennas and Propagation, vol. 2009, Article ID 610109, 13 pages, doi: 10.1155/2009/610109.

* cited by examiner

*Primary Examiner* — Thomas H Tarcza
*Assistant Examiner* — Frank McGue
(74) *Attorney, Agent, or Firm* — Brion Raffoul

(57) ABSTRACT

Methods and systems for detecting GNSS signals originating from an inauthentic source. A synthetic array using a receiver antenna which is randomly spatially translated may be used to gather alleged GNSS signals. The signals are then processed to determine the spatial correlation between them. A high spatial correlation between the signals indicates a probable inauthentic source for the GNSS signals.

18 Claims, 10 Drawing Sheets

METHOD AND SYSTEM FOR DETECTING GNSS SPOOFING SIGNALS

TECHNICAL FIELD

The present invention relates to global navigation satellite system (GNSS) signals. More specifically, the present invention relates to methods and devices for determining whether incoming GNSS signals are originating from an inauthentic source.

BACKGROUND OF THE INVENTION

Recently it has become evident that spoofing poses a significant threat to GNSS receivers. Hence, spoofing detection and mitigation has become an active area of research. The authentic GNSS signal sourced from a satellite Space Vehicle (SV) is very weak at the location of the terrestrial receiver and is therefore vulnerable to hostile jamming based on narrowband noise transmission. As the GNSS frequency band is known to the jammer, its effectiveness is easily optimized by confining its radiation to within the relatively narrow GNSS signal band. The transmit power requirements of a jammer placed several kilometers away from the GNSS receiver is modest with several Watts Equivalent Isotropically Radiated Power (EIRP) being sufficient to deny the GNSS receiver of any reliable pseudo-range estimates. There are several means of mitigating such noise jammers, namely:

Increased Processing Gain Based on Using Longer Coherent Integration Times

The processing gain of the GNSS spread spectrum receiver is given as the product of the bandwidth of the complex baseband signal and the coherent integration interval which can in principle be increased arbitrarily. However, in dynamic platform scenarios, a minimum update rate must be maintained limiting the coherent integration interval. Considering a high dynamic case where a 1 ms update rate is required, based on a GPS C/A signal with bandwidth of about 1 MHz, then the processing gain is limited to about 30 dB. Hence a jammer power of only −100 dBm at the GPS receiver output will result in a signal to jammer ratio of approximately 0 dB which is insufficient for robust signal detection.

Adaptive Null Steering

A GNSS receiver equipped with multiple antennas can provide null steering in the direction of the jammer. Adaptive processing that tracks the bearing of the jammer can be implemented. The depth of the null is a function of the platform dynamics of the jammer and GNSS receiver. In static scenarios 40 to 50 dB of nulling is possible with just two antennas however; very precise phasing of the two antennas is required. A further disadvantage of this method is that a minimum of two spatially separated antennas will be required. Note that as the GNSS signals are mutually orthogonal, adaptive processing can be applied to each SV signal independently. Also, typically, the jammer will originate from a single bearing and hence a minimal array of only two antennas is sufficient to null out the jammer.

GNSS Diversity

Recently more sources of GNSS signals have become available in different frequency bands with the receiver can exploit by limiting observables to signals that are not jammed. However, the jammer can obviously counter this by simultaneously radiating noise in the various relevant GNSS bands.

Navigation Diversity

The user of the GNSS receiver may have alternate means of navigation which will be used as an alternate to the compromised GNSS outputs.

Physically Disabling Jammer

Ultimately the jammer can be easily located and physically disabled.

While noise jamming of the GNSS receiver is a threat, the user is easily aware of its existence and characteristics. The worst case is that GNSS based navigation is denied. A more significant jamming threat that is currently emerging is that of the spoofing jammer where bogus signals are transmitted from the jammer that emulates authentic GNSS signals. This is done with multiple SV signals in a coordinated fashion to synthesize a plausible navigation solution to the GNSS receiver. The objective of the jammer is then to cause the navigation solution as generated by the GNSS receiver to drift away from the true position. The drift is carefully orchestrated such that the GNSS receiver is unaware that it is being spoofed. The consequence of a drifting navigation solution believed to be authentic is generally more dire to the GNSS user than a GNSS receiver disabled by jamming that the user is aware of. Fortunately, spoofing is often detectable as the bogus SV signals generated by the jammer move too quickly or too erratically which is detectable by a tracking filter. Furthermore, to be effective, the bogus navigation solution synthesized by the jammer has to sweep through the true solution currently tracked by the GNSS receiver and to capture it similar to the classical range gate pull off methods applied to radar jamming. The GNSS receiver tracking filter can further incorporate multiple ancillary sensor signals in addition to the GNSS signals to verify the plausibility of the computed navigation solution.

An exploitable weakness of the spoofing jammer is that for practical deployment reasons, the spoofing signals generally come from a common transmitter source. Hence a single jamming antenna sources the spoofing signals simultaneously. This results in a means of possible discrimination between the real and bogus GNSS signals as the authentic GNSS signals will emanate from known bearings distributed across the hemisphere. Furthermore, the bearing of the jammer as seen from the GNSS receiver will be different than the bearing to any of the tracked SV's. This immediately sets up some opportunities for the GNSS receiver to reject the spoofing jamming signals. Some of these opportunities are as follows:
 (i) Processing can be built into the GNSS receiver that estimates the bearing of each of the SV signals. Note that the relative bearings of the GNSS signals are sufficient in this case as the bogus GNSS signals will all have a common bearing while the authentic GNSS signals will always be at different bearings. If the GNSS bearings are not consistent with the expected distribution then an alarm can be generated indicating the possibility of spoofing signals.
 (ii) Unobstructed SV signals will reach the GNSS receiver with a signal strength that is known within a small range. If the received signal is significantly stronger than expected then spoofing can be suspected. If the spoofing signal is too weak it will not capture the GNSS receiver tracking.

If the GNSS receiver has multiple antennas and if the position of the antennas is such that there is an unobstructed line of sight (LOS) to the SV's then there are possibilities of:
 Detection of the spoofing based on the common bearing of the received GNSS signals.
 Eliminating all the jammer signals simultaneously by appropriate combining of the receiver antennas to form a pattern null coincident with the jammer bearing.

Unfortunately the above will not be an option if the jammer signal or SV signals are subjected to spatial multipath fading.

In this case, the jammer and individual SV signals will come in from several bearings simultaneously. Another problem is if the GNSS receiver is constrained by the form factor of a small handset device such that an antenna array is not an option. As the carrier wavelength of GNSS signals is on the order of 18 to 25 cm, at most two antennas can be considered for the handset receiver. Such a handset receiver with two antennas can be considered as an interferometer that has some ability for relative signal bearing estimation as well as nulling at specific bearings. However, such an antenna pair is not well represented by independent isotropic field sampling nodes but will be significantly coupled and strongly influenced by the arbitrary orientation that the user imposes. Hence the handset antenna is poorly suited for discrimination of the spoofing signal based on bearing. Furthermore, the handheld receiver is typically used in areas of multipath or foliage attenuation and therefore the SV signal bearing and strength are random with significant variation.

There is therefore a need for methods and devices which can be used to detect spoofing or signals originating from an inauthentic source.

SUMMARY OF INVENTION

The present invention provides methods and systems for detecting GNSS signals originating from an inauthentic source. A synthetic array using a receiver antenna which is randomly spatially translated may be used to gather alleged GNSS signals. The signals are then processed to determine the spatial correlation between them. A high spatial correlation between the signals indicates a probable inauthentic source for the GNSS signals.

In one aspect, the present invention provides a method for determining if incoming signals are from a single source, the method comprising:
a) gathering a plurality of samples of said incoming signals
b) determining a measure of spatial correlation between said samples gathered in step a)
c) determining if said signals are originating from a single source based on said measure of said spatial correlation between said samples.

In a second aspect, the present invention provides computer readable media having encoded thereon computer readable instructions which, when executed, perform a method for determining if incoming GNSS (global navigation satellite system) signals are from an inauthentic source, the method comprising:
a) gathering a plurality of samples of said incoming GNSS signals
b) determining a measure of spatial correlation between said samples gathered in step a)
c) determining if said signals are originating from an inauthentic source based on said measure of said spatial correlation between said samples.

In a third aspect, the present invention provides a system for determining if incoming GNSS signals are originating from an authentic or an inauthentic source, the system comprising:
at least one antenna
signal sampler means coupled to said at least one antenna for sampling incoming GNSS signals received through said at least one antenna
data storage means for storing GNSS signal samples sampled by said signal sampler means
processor means for determining a spatial correlation between GNSS signal samples received through said at least one antenna.

BRIEF DESCRIPTION OF THE DRAWINGS

The invention will be described with reference to the accompanying drawings, wherein.

DETAILED DESCRIPTION OF THE INVENTION

It should be noted that, throughout this document, the term "spoofing" refers to the act or attempt to mislead receivers into using non-genuine GNSS signals originating from inauthentic sources instead of genuine GNSS signals originating from SVs. "Spoofer" refers to the transmitters that transmit these inauthentically sourced signals. An inauthentic source, in this document, refers to an illegitimate or unintended signal source which transmits untrue GNSS signals that may be received by GNSS receivers and which may mislead such GNSS receivers as to the true mapping solution. An inauthentic source would transmit inauthentic GNSS signals as opposed to an authentic source (e.g. a GNSS SV) which provides authentic GNSS signals.

Figure 1:
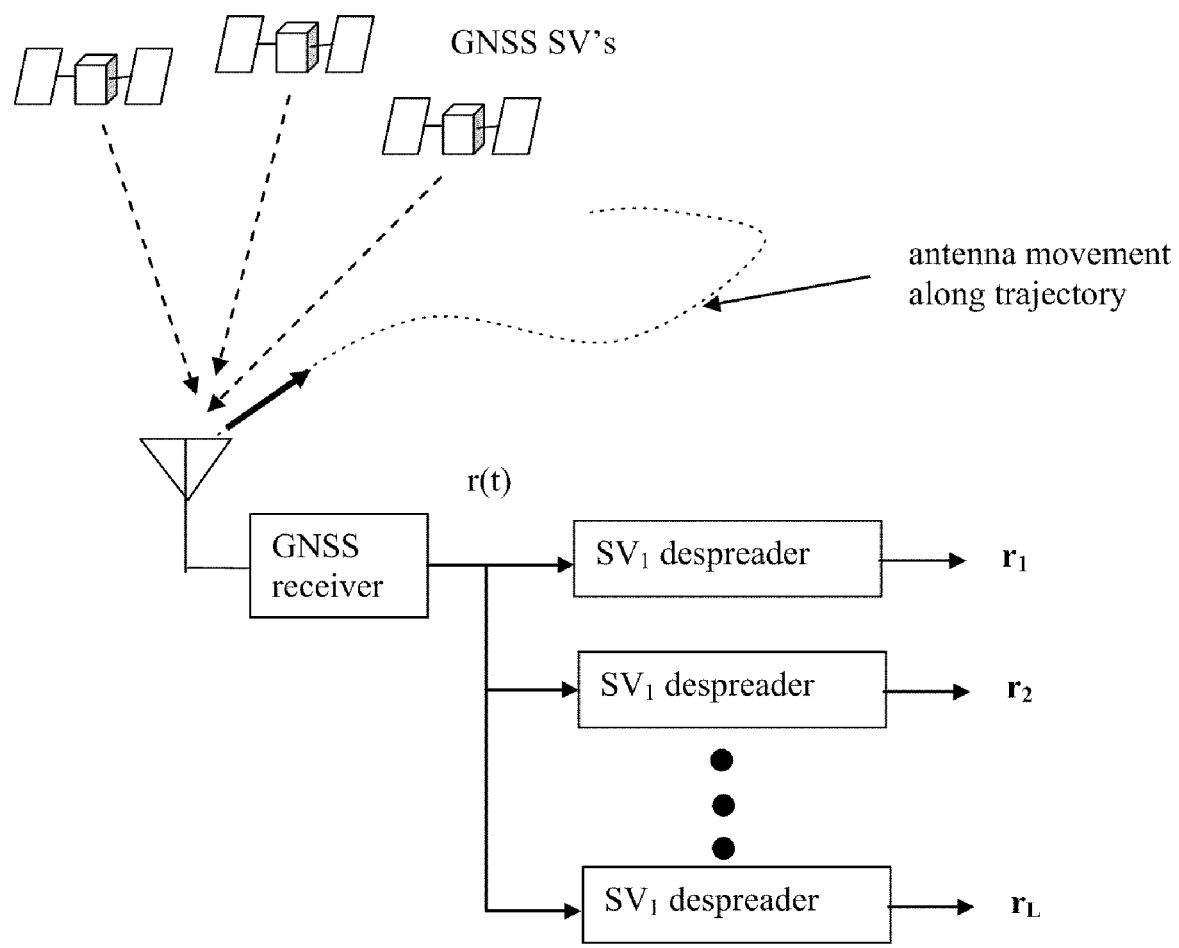
FIG. 1 illustrates a synthetic array antenna translated spatially.

Consider the GNSS handset receiver shown in FIG. 1 consisting of a single antenna that is spatially translated in time along an arbitrary trajectory as the signal is processed by the GNSS receiver. It is assumed here that the receiver despreads the received baseband signal (denoted as r(t) in FIG. 1) with L correlators set at the appropriate code delay and Doppler frequency commensurate with the current tracking point of the L visible authentic GNSS signals. Based on this, r(t) can be expressed as $$r(t) = \sum_{i=1}^{L} A_{A,i}(p(t), t) c_i(t - D_i) e^{j2\pi f_{di} t} + w(t) \quad (1)$$

where:

i—index of visible GNSS SV's p(t)—physical position of the phase center of the moving antenna $A_{A,i}(p,t)$—channel gain for the authentic GNSS signal of the ith SV at t and position p $c_i(t)$—spread spectrum coding modulation $D_i$—code delay of ith SV signal $f_{di}$ Doppler frequency of ith SV signal w(t) complex baseband of additive noise of receiver antenna The subscript 'A,i' denotes authentic signal corresponding to the ith SV. The objective of the despreading operation of the receiver is to isolate the channel gains $A_{A,i}(p,t)$ which are raw observables that are used in the subsequent navigation tracking processing. The despreading operation is based on the multiplication of $c_i^*(t-\tau_i)d_i^*(t-\tau_i)\exp(-j2\pi f_{di}t)$ where * denotes the complex conjugate followed by a low pass filter operation denoted as LPF{ } which has a bandwidth which is larger than the bandwidth of $c_i^*(t)$ but much smaller than the spread spectrum bandwidth of the GNSS signals. The outcome of the ith despreading channel is denoted as $x_i(t)$ which is expressed as $$x_i(t) = LPF\{r(t)c_i^*(t-\tau_i)d_i^*(t-\tau_i)\exp(-j2\pi f_{di}t)\} \quad (2)$$
$$\approx A_{A,i}(p(t), t) + w_i(t)$$

where $w_i(t)$ is the additive noise term and given as $$w_i(t) = LPF\{w(t)c_i^*(t-\tau_i)d_i^*(t-\tau_i)\exp(-j2\pi f_{di}t)\} \quad (3)$$

As indicated in FIG. 1, it is assumed that there are L despreader channels simultaneously processing the L visible SV's with the outputs as $x_i(t)$. In this formulation it is assumed that the data coding, code phase of the spreading signal, and Doppler are known inputs in the despreading operation. Justification of this simplification is based on the assumption that the GNSS receiver is in a state of tracking the L available GNSS signals.

Figure 2:
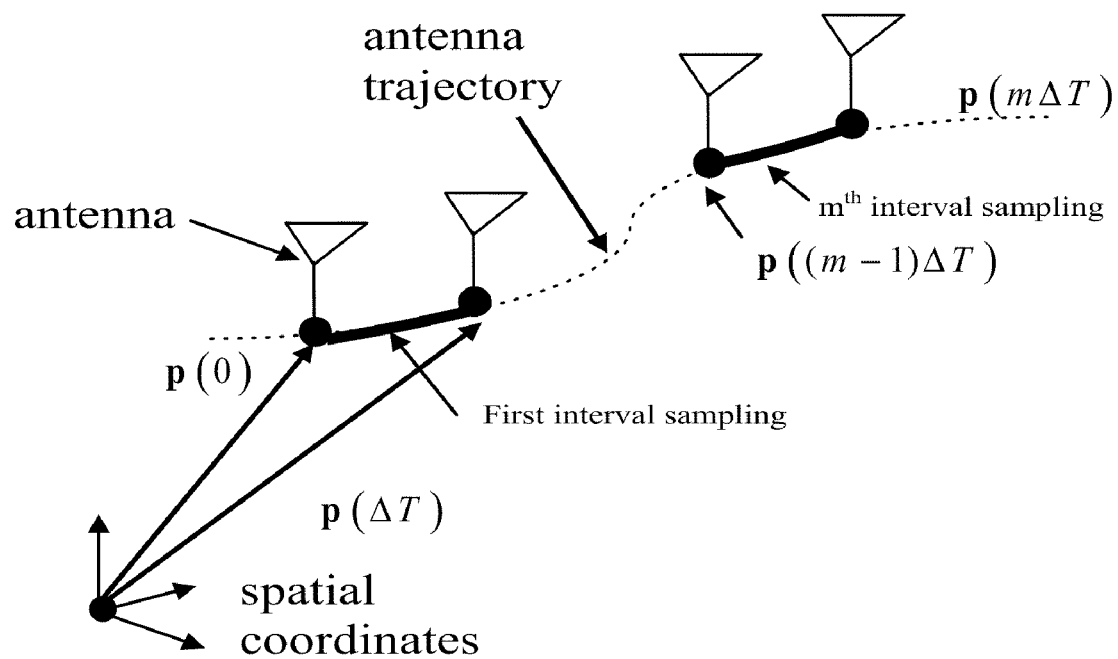
FIG. 2 illustrates a spatial sampling of the antenna trajectory into M subinterval segments.

The despread signals, $x_i(t)$ are collected over a snapshot interval of t∈[0,T]. As the notation is simplified if discrete samples are considered, this interval is divided into M sub-intervals each of duration ΔT such that the mth subinterval extends over the interval of [(m−1)ΔT,mΔT] for m∈[1,2, . . . , M]. The collection of signal over the first and mth subintervals is illustrated in FIG. 2.

ΔT is considered to be sufficiently small such that $A_{A,i}(p(t),t)$ is approximately constant over this interval leading to a set of M discrete samples for each despreading output. Define $x_{i_m}$ as the m-th sample of the i-th despreader such that $$x_{i_m} = \frac{1}{\Delta T}\int_{(m-1)\Delta t}^{m\Delta T} x_i(t)\,dt \approx A_{A,i}(p(m\Delta t), m\Delta t) + w_i(m\Delta t). \quad (4)$$

The vector forms of the sample sets are introduced for notational convenience as
$x_i = [x_{i_1}, \ldots, x_{i_M}]^T$, $A_{A,i} = [A_{A,i}(p(\Delta T),\Delta T), \ldots, A_{A,i}(p(M\Delta T), M\Delta T)]^T$, and $w_i = [w_i(\Delta T), \ldots, w_i(M\Delta T)]^T$ where the superscript T (in this context) denotes transpose. With these definitions the detection problem is stated as $$x_i = A_{A,i} + w_i \quad (5)$$

At this stage it is also convenient to introduce $\rho_i$ as the signal-to-noise ratio (SNR) of the ith SV signal as the signal energy of the ith SV captured by the receiver during the measurement interval of ΔT to the power spectral density of the additive channel noise. For cases where it is assumed that the authentic signals are LOS (line of sight) then the bearings of the L signals are well separated that $A_{A,i}$ will appear as approximately uncorrelated sequences. An observation which will become relevant shortly is that in NLOS (non-line of sight) scenarios, the spatial variation of the authentic signals will also typically be uncorrelated.

Next, consider the case where a jammer spoofing signals emulating the L visible authentic GNSS signals are present and are sourced from a common bearing coincident with the jammer transmit antenna. As stated earlier it will be assumed that the spoofing jammer has successfully 'swept through' the code delay of the authentic signal and has captured the tracking loop and dragged it off sufficiently such that the despreading signal corresponding to the spoofing signals are uncorrelated with respect to the despreading signals that would be required for the authentic signals. Under this assumption $x_i$ is simplified as $$x_i = A_{J,i} + w_i \quad (6)$$

where $A_{J,i}$ denotes the channel gain vectors for the jammer signals respectively. Note that $x_i$ is not a function of $A_{J,i}$ as the code delay and Doppler of the corresponding i-th spoofing and i-th authentic signals are sufficiently separated such that they can be approximated as being uncorrelated. Consequently, in this case the authentic GNSS signals are a negligible component of the white noise component $w_i$.

The key simplification applied to (10) is that the jammer spoofing signals all have the same channel gain vectors except for a complex scaling factor denoted by $g_i$ such that $$A_{J,i} = g_i A_J \quad (7)$$

resulting in $$x_i = g_i A_J + w_i \quad (8)$$

A relevant observation is that this simplification is independent of spatial multipath effects. Consequently, as will be shown, the spoofing detection works just as well in LOS conditions as in NLOS conditions. For LOS cases this will imply that the bearings of the L signals will all be the same. In a multipath environment this implies that all of the L spoofing signals will have the same variation such that $A_{J,i}$ are the same except for a complex scaling factor.

Single Snapshot Detection Hypothesis Statement

For each signal snapshot interval T, the L despreading channels of the receiver associated with the L tracked GNSS signals will produce the set of vectors $x_i$ i=1, . . . L. Two hypothesis states will be considered:

$H_0$: L GNSS signals are sourced from the spoofing jammer that has succeeded in pulling the track points of all the L signals such that the corresponding spoofing and authentic signals are uncorrelated. Hence, $$x_i|H_0 = g_i A_J + w_i \quad (9)$$

$H_1$: L GNSS signals are sourced from authentic individual SV's. The spoofing jammer is either not present or has been unsuccessful in pulling the track points of the L signals such that the jammer signals are uncorrelated with respect to the authentic signals. Hence, $$x_i|H_1 = A_{A,i} + w_i \quad (10)$$

Regardless of the state being $H_0$ or $H_1$, the L vectors $x_i$ are combined into an overall M×L data matrix as $$X = [x_1 x_2 \ldots x_L] \quad (11)$$

This data needs to be combined into a single scalar test variable that provides a quantitative metric indicating the likelihood that the receiver tracking is associated with authentic signals as opposed to being compromised by spoofing. This test variable denoted as $G_1(X)$, is ideally a scalar function monotonically increasing with likelihood of authentic tracking. The value of $G_1(X)$ can be used as a soft measure of likelihood or can be used in a hard binary decision decoder when compared with a threshold denoted as $\lambda_A$. Hence, the hard decoding is represented as $$G_1(X) \begin{matrix} < \lambda_A & H_0 \\ > \lambda_A & H_1 \end{matrix} \quad (12)$$

Principle of Detection

Initially consider the case where there is no additive noise such that $$X = \begin{cases} [g_1 a_J \quad g_2 a_J \quad \ldots \quad g_L a_J]^T & H_0 \\ [a_{A,1} \quad a_{A,2} \quad \ldots \quad a_{A,L}]^T & H_1 \end{cases} \quad (13)$$

Note that for the $H_0$ case that all the columns of X are scalar multiples of each other and therefore rank(X)=1. In the $H_1$ case, the column vectors of X correspond to channel gains of the L satellites that are at different bearings. As the vectors $\{a_{A,1}, a_{A,2}, \ldots a_{A,L}\}$ are all linearly independent with high probability, rank(X)=L. Therefore, the processing of the observed data contained in X can be to determine the matrix rank such that $$G(X) = \text{rank}(X) \quad (14)$$

An immediate problem with the test statistic of G(X)=rank (X) is that when the additive channel noise, is included, then the case of rank(X)=L has a high probability regardless of $H_0$ or $H_1$ states. For this reason, the distribution of the singular values of X or the eigenvalues of $X^H X$ is required to be considered. Hence, an intermediate process consists of $G_f(X)$ =svd(X) or $G_f(X)$=eig($X^H X$) resulting in a reduction of observables from an M×L complex matrix to an array of L real values. Note svd( ) and eig( ) are operators that determine the array of singular values and eigenvalues respectively. The problem remains of determining how to process these L real values into a single scalar variable that can be used for the binary decision of $H_0$ or $H_1$ is most likely. One possibility is to order the singular values in descending order numbering them as $$svd(X) = \{s_1, s_2, \ldots, s_L\} \quad (15)$$

where $s_i \in \Re$, $s_i \geq 0$. A possible processing method is then $$G(X) = \frac{\sum_{i=2}^{L} s_i^2 - s_1^2}{\sum_{i=1}^{L} s_i^2} \quad (16)$$

For the spoofing case in moderate SNR conditions, X will have a single dominant singular value such that $G(X) \approx -1$. On the other hand, for the authentic case, if it as assumed that the array is sufficiently long such that the sequences of $\{a_{A,1}, a_{A,2}, \ldots a_{A,L}\}$ are approximately orthogonal, then all of the singular values will be comparable in amplitude such that $$G(X) \approx \frac{L-1}{L}.$$

The condition that $\{a_{A,1}, a_{A,2}, \ldots a_{A,L}\}$ are approximately orthogonal is physically analogous to the beamwidth that would result from the given antenna trajectory used would be less than the separation between the various bearings of the authentic SV signals.

As an example, consider a straight line trajectory with M=10 uniform spatial samples and L=5. All the signals from the spoofer originate from a common source such that $$a_J = [1, e^{-j0.7}, \ldots, e^{-j(M-1)0.7}]^T \quad (17)$$

where a LOS condition is assumed. The amplitudes of the L spoofing signals are circularly normal with unit variances such that $$E[g_i g_j^*] = \begin{cases} 1 & i = j \\ 0 & i \neq j \end{cases}.$$

The vectors are combined into a data matrix, denoted here as $X_0$ and given as $$X_0 = [g_1 a_J g_2 a_J \ldots g_L a_J]. \quad (18)$$

Next, for the L authentic SV signals, it can be assumed that their bearings are distributed randomly across the hemisphere such that $$E\left[[a_{A,i}]_m [a_{A,j}^H]_n\right] \approx \begin{cases} 1 & i = j = m = n \\ 0 & \text{otherwise} \end{cases} \quad (19)$$

can be approximated and generate a random data matrix as $$X_1 = [a_{A,1} a_{A,2} \ldots a_{A,L}]. \quad (20)$$

It should be noted that E[ ] denotes the expectation value of the argument or the mean value of the argument.

Figure 3:
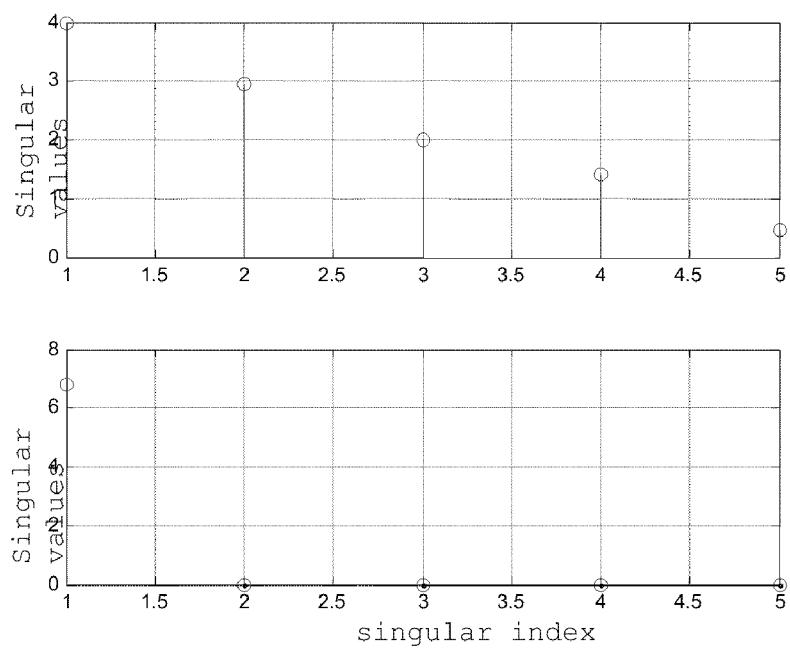
FIG. 3 illustrates plots showing the singular values for authentic SV (upper) and spoofer or jammer (lower) signals.
Figure 4:
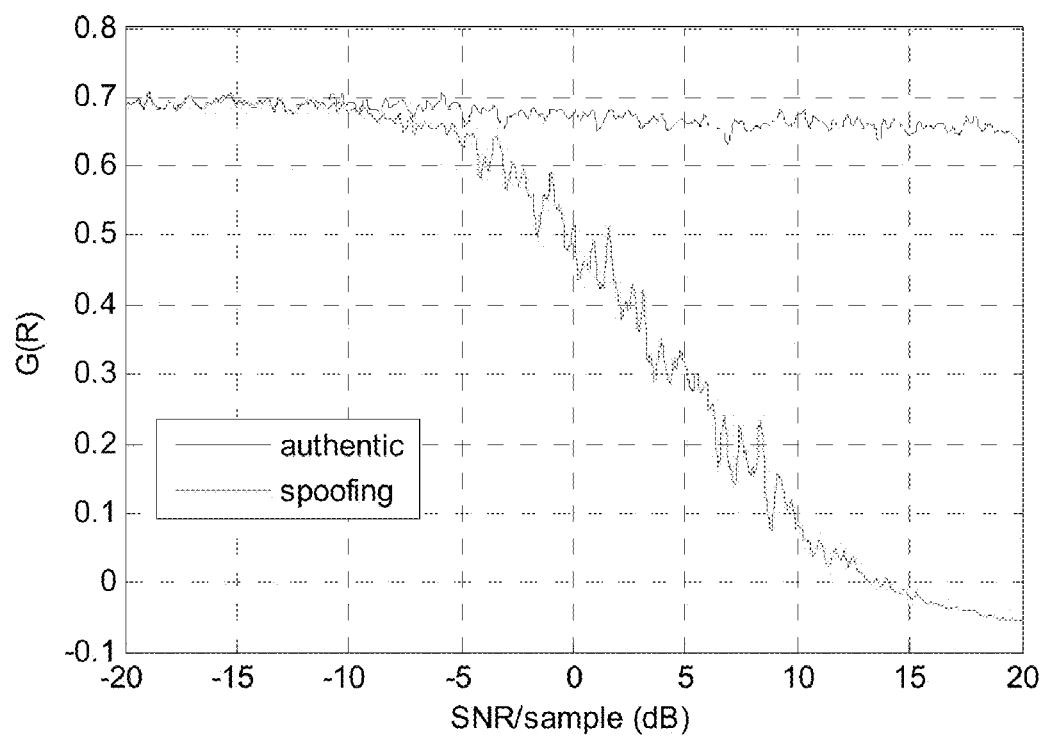
FIG. 4 is a plot of singular values of authentic SV and jammer or spoofer signals with additive channel noise SNR of 0 dB and M=10.

A sample plot of the singular values of $X_0$ and $X_1$ in descending order are given in FIG. 3 for the no noise case of $\rho = \infty$ where $\rho$ indicates signal-to-noise ratio (SNR). Note that for the authentic case there are L=5 nonzero singular values while for the jammer case there is only one. Hence, in this idealized example, detection of the jammer case based on G(X) will clearly perform well. However, as $\rho$ is decreased, $G(X_0)$ increases towards $G(X_1)$ such that the detection performance decreases. FIG. 4 gives a plot of $G(X_0)$ and $G(X_1)$ as a function of $\rho$. Note that good detection performance of the spoofing case is possible for $\rho$ greater than about −5 dB.

Figure 5:
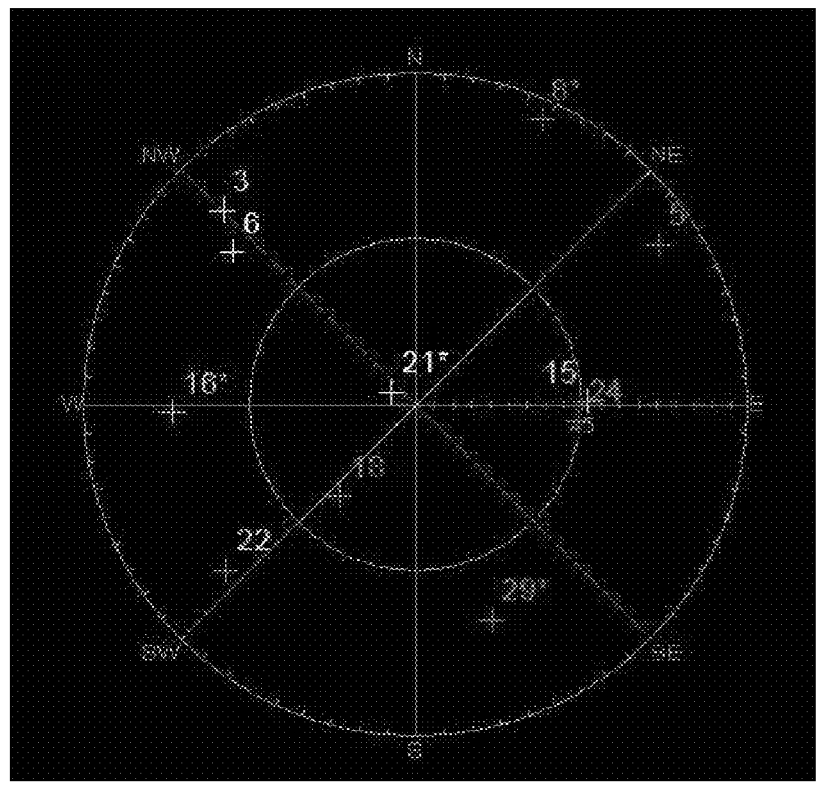
FIG. 5 is a sky plot of transmitted spoofing GNSS signals as simulated according to one implementation.

Experimental verification of the spoofing detection based on utilizing a single antenna that is spatially translated were carried out and the results are provided below. Two measurement scenarios will be given with the aim of demonstrating the practicality of the detection of a spoofing signal based on the spatial signal correlation discriminator introduced above. The experimental measurements are based on the reception of GPS L1 C/A signals. At the particular instance of the measurement, the SV's were distributed as per the sky plot given in FIG. 5. The measurements were conducted inside a modern three story commercial building where the layout of the office and laboratory facilities is given in FIG. 6. The red symbol labelled '$T_x$' is the location of the spoofing jammer. The green symbol labelled '$R_x$' is the location of the receiver which is moved along the dashed line. The signals for the spoofing transmission were generated by the Spirent hardware simulator (HWS) which were radiated by a directional antenna. The intention of this indoor setup of the spoofing source was to generate NLOS propagation conditions with significant multipath. The GNSS receiver consisted of an active patch Right-Hand Circular Polarized (RHCP) antenna and a National Instrument down conversion channelizer receiver that sampled the raw complex baseband signal r(t). The total data record was subsequently processed which consisted of acquiring the correlation peak based on 20 ms coherent integration of the GNSS spoofing signals and extracting the channel gains, $a_{J,i}$ as a function of time.

Figure 7:
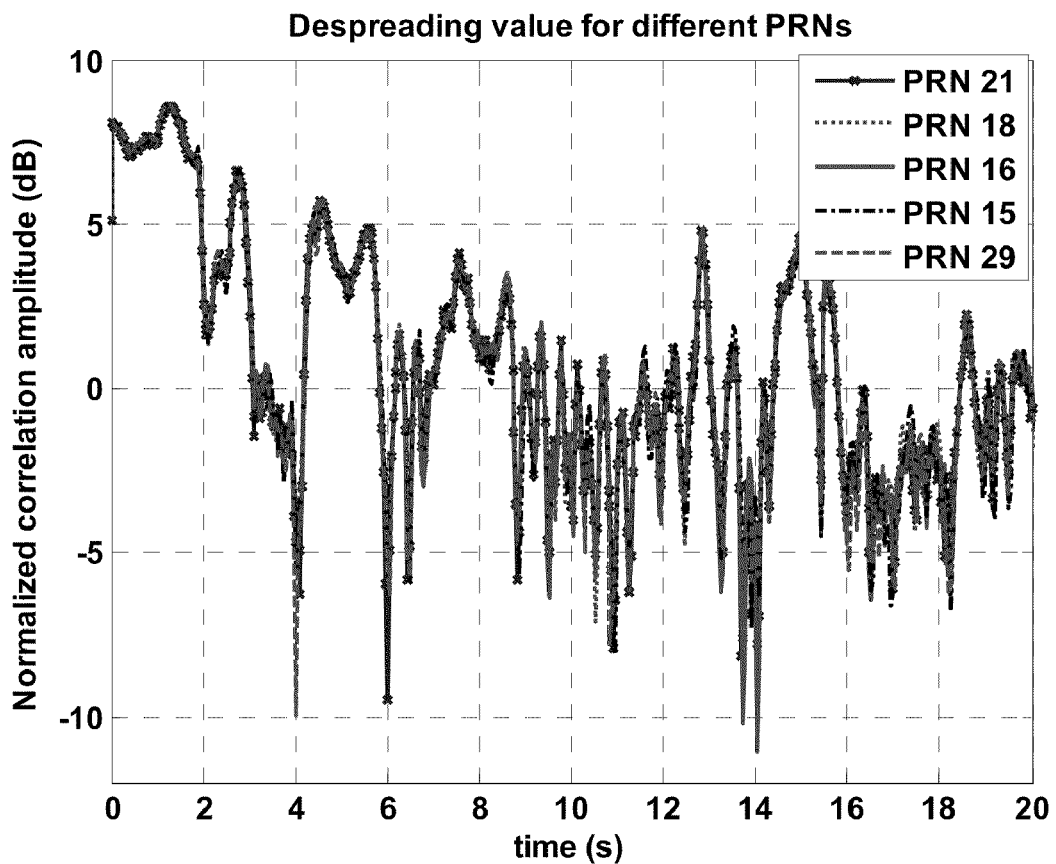
FIG. 7 is a plot illustrating the normalized amplitude value of the correlation function for different PRNs generated from the same antenna.

FIG. 7 shows a plot of the samples of the magnitude of $r_i$ for the various SV signals generated by the spoofing jammer. Note that the magnitude of $r_i$ are obviously highly correlated. This is to be expected as the jammer signals are all emanating from the common antenna shown in FIG. 7. Also the SNR's, $\rho_{J,i}$, are high such that the decorrelation due to the channel noise is not significant.

While the general processing would consider the singular values of the data matrix X or eigen values of $XX^H$ a special case of this would be to determine the pairwise correlation between two data vectors. This pairwise correlation can be quantified based on the standard numerical estimate of the correlation coefficient given as $$c_{ij} = \frac{E[x_{A,i} x_{A,j}^H]}{\sqrt{E[x_{A,i} x_{A,i}^H]} \sqrt{E[x_{A,j} x_{A,j}^H]}} \qquad (21)$$

These are calculated for the measurement results represented in FIG. 7 and tabulated in Table 1. As evident, and expected, the correlations are all very high. This is anticipated as the spoofing signals all occupy the same frequency band with exception of small incidental shifts due to SV Doppler.

TABLE 1

Correlation coefficient determined for the set of transmitted spoofing signals

| PRN | 21 | 18 | 16 | 15 | 29 |
|---|---|---|---|---|---|
| 21 | 1 | 0.98 | 0.98 | 0.96 | 0.98 |
| 18 | 0.98 | 1 | 0.97 | 0.94 | 0.97 |
| 16 | 0.98 | 0.97 | 1 | 0.98 | 0.99 |
| 15 | 0.96 | 0.94 | 0.98 | 1 | 0.98 |
| 19 | 0.98 | 0.96 | 0.99 | 0.98 | 1 |

Figure 8:
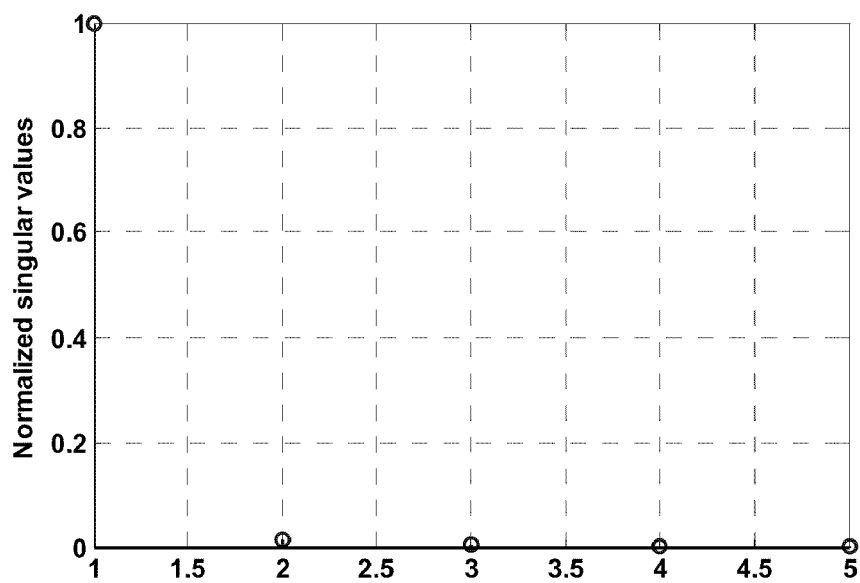
FIG. 8 is a plot illustrating singular values for the data matrix X for the spoofing signals in one implementation of the invention.

The singular values of the measurement data matrix X for the spoofing signal are shown in FIG. 8. As expected, due to the high correlation there is only a single dominant singular value. The small residual values of the other singular values are due to the channel noise and slightly imperfect despreading of the L spoofing signals. The G(X) discriminator value for this case is about −0.95. In summary, the main observation from this set of measurements is that the spoofing signals are highly spatially correlated even under NLOS conditions coupled with significant multipath.

Data Collection of Authentic and Jamming Signals Under LOS Conditions

Figure 6A:
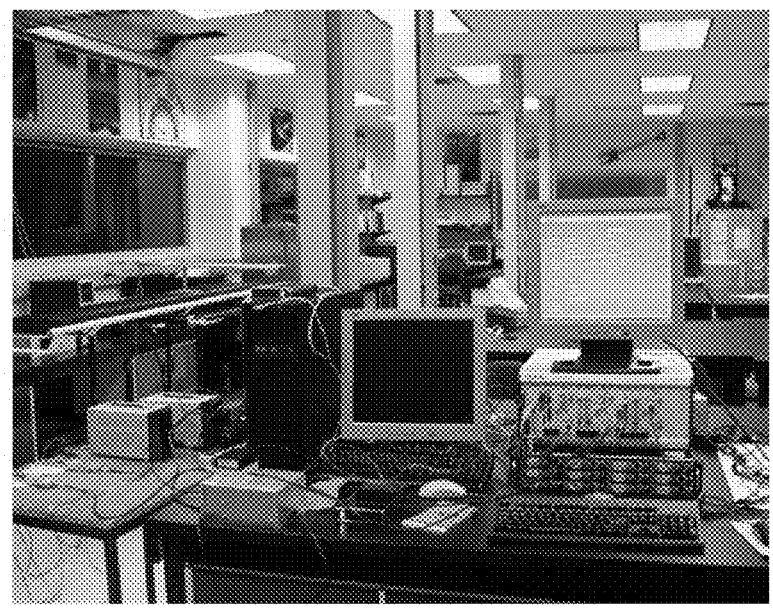
FIG. 6a illustrates indoor laboratory facilities where one implementation was tested and illustrates obstacles to a line of sight between a spoofer transmitter and a receiver according to one aspect of the invention.
Figure 6B:
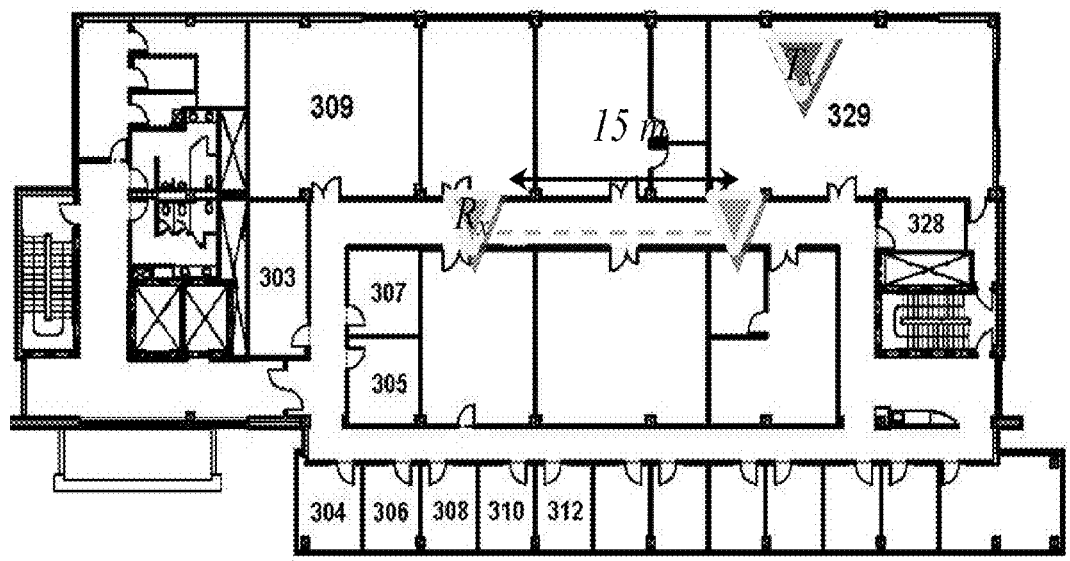
FIG. 6b illustrates the floor plan of a building where one implementation of the invention was tested and it also illustrates a location of the spoofing jammer and the receiver.

For this measurement, the Spirent HWS signal was radiated from a directional antenna mounted on the roof of the same commercial building used in the previous measurement (see FIG. 6). The spoofing transmissions of the Spirent HWS were brief and tightly controlled in terms of transmitted power to avoid disruption of other local GPS users. The GPS receiver consisted of the same active GPS patch antenna used in the previous measurement as well as the National Instrument channelizer. During the data collection process the antenna was randomly moved by hand along an arbitrary trajectory. The received complex baseband signal was collected over a time interval of several seconds which consisted of a superposition of authentic signals from the currently visible SV's as well as the spoofing signal.

Figure 9:
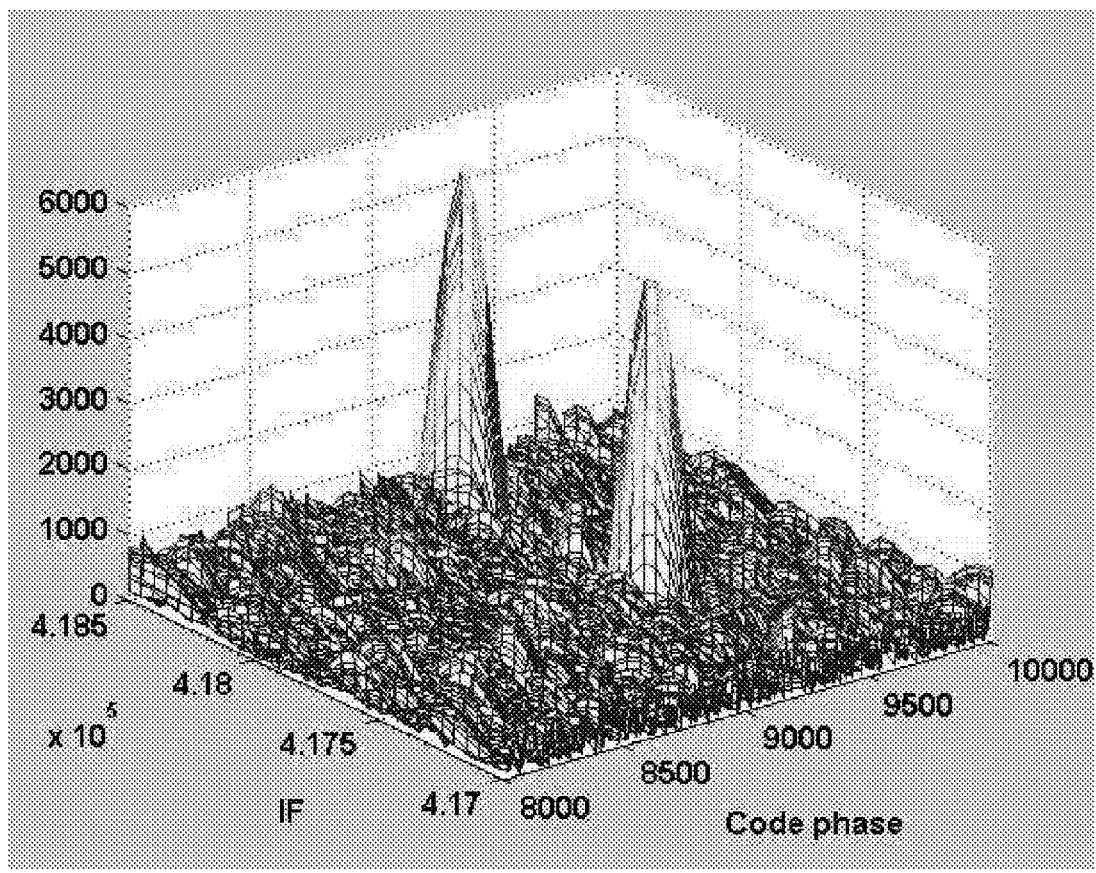
FIG. 9 is a plot showing the correlation output of authentic GPS PRN 4 in the presence of a spoofing transmitter.

FIG. 9 shows the correlation output of authentic GPS SV signal corresponding to PRN 4 in addition to the correlation peak of the jamming signal programmed to synthesize a spoofing replica of PRN 4. Two detectable peaks corresponding to the authentic and the spoofer signals are represented.

Figure 10:
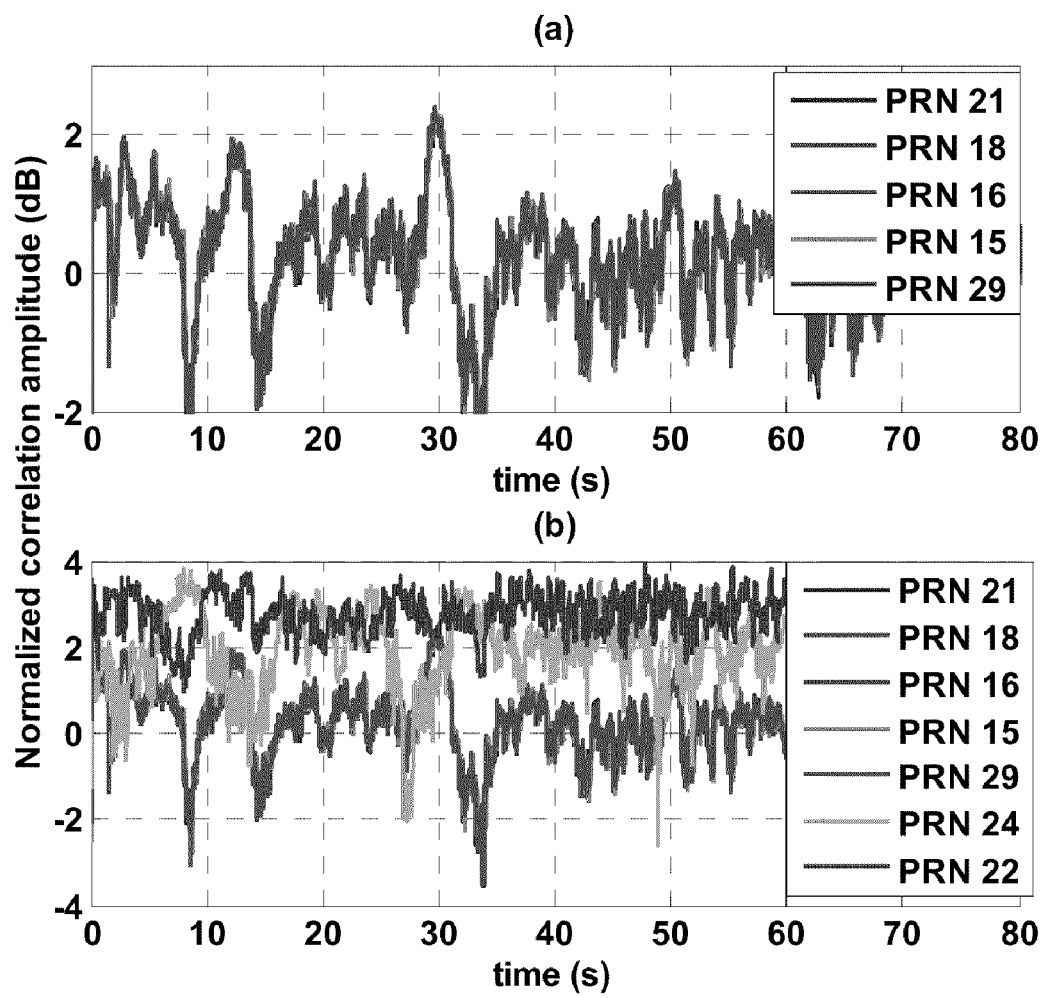
FIGS. 10a and 10b are plots illustrating the magnitude of the correlation function for the spoofed (upper) and the authentic GPS (lower) signals in one implementation of the invention.

FIG. 10a (upper) shows the magnitude of the correlation peaks of different SV signals generated from the spoofer as the receiver antenna was randomly moved. As evident, the channel gains of the set of spoofer signals during the measurement interval are highly correlated. This is expected as the spoofing signals are all radiated from the same location via the antenna on the rooftop. FIG. 10b (lower) shows the channel gains of the authentic SV signals that were present during the measurement interval overlaid with the spoofing signals (Note the spoofing signal PRN's were purposely selected to correspond to SV's that were currently not visible to minimize any possible disruption due to the transmitted spoofing signal.). Note that the channel gain functions of the authentic SV signals are uncorrelated over the measurement interval while the spoofing signal channel gains are highly correlated. Also note that the authentic and spoofing signal channel gains are mutually uncorrelated as expected since the spoofing transmitter is at a different bearing than any of the visible SV's. Table 2 shows the magnitude of the correlation coefficients for the set of authentic SV's as calculated based on equation (21). Note that, as expected, the correlation coefficients are much smaller than for the spoofing case for the previous indoor measurements as given in Table 1.

TABLE 2

Correlation coefficient for different PRNS

| PRN | 21 | 18 | 16 | 15 | 29 | 24 | 22 |
|---|---|---|---|---|---|---|---|
| 21 | 1 | 0.89 | 0.90 | 0.75 | 0.22 | 0.21 | 0.89 |
| 18 | 0.89 | 1 | 0.83 | 0.71 | 0.23 | 0.19 | 0.82 |
| 16 | 0.90 | 0.83 | 1 | 0.72 | 0.21 | 0.20 | 0.89 |
| 15 | 0.75 | 0.71 | 0.72 | 1 | 0.18 | 0.18 | 0.76 |
| 29 | 0.22 | 0.23 | 0.21 | 0.18 | 1 | 0.23 | 0.20 |
| 24 | 0.21 | 0.19 | 0.20 | 0.18 | 0.23 | 1 | 0.21 |
| 22 | 0.89 | 0.82 | 0.89 | 0.76 | 0.20 | 0.21 | 1 |

Figure 11:
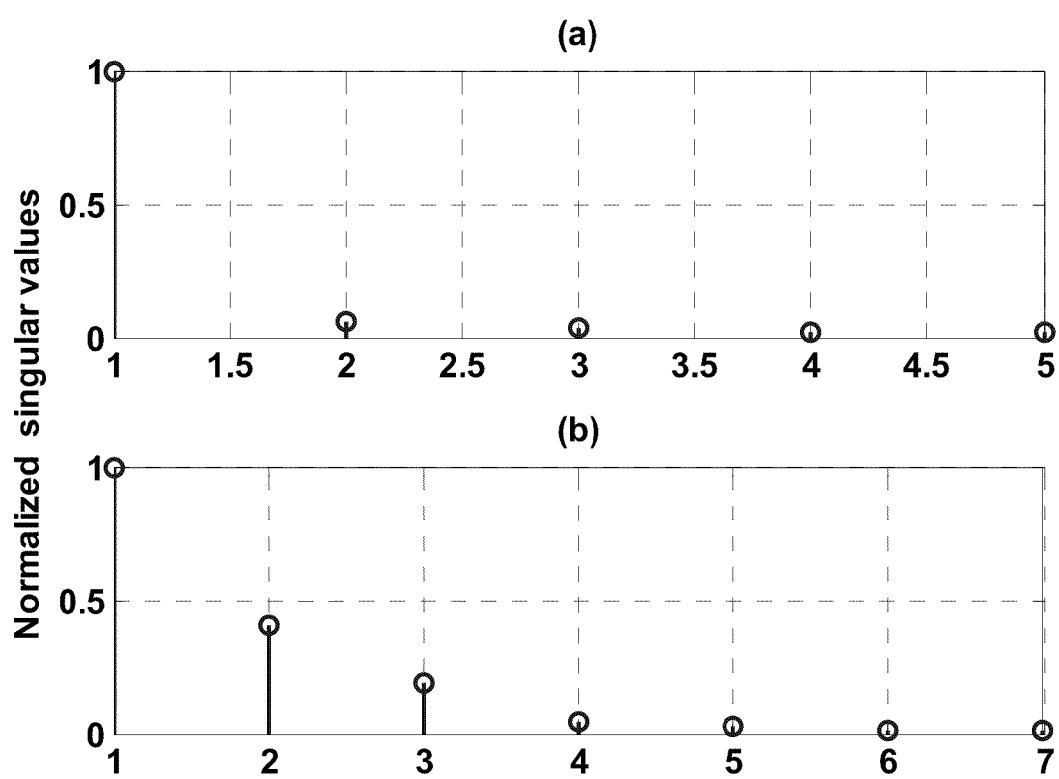
FIGS. 11a and 11b are plots illustrating the singular values for the data matrix corresponding to the set of SV spoofing signals (upper) and corresponding to the set of SV authentic signals.

Next, the singular values of the data matrix corresponding to the spoofing and authentic cases are determined. These are given in FIG. 11a and FIG. 11b for the spoofing and authentic data sets respectively. It should be noted that in FIG. 11a there is a dominant singular value and that the other singular values are significantly smaller. The G(X) value for this case is about −0.6. As $\rho_{J,i}$ is lower than for the indoor spoofing signal propagation, the residuals of the non-dominant singular values are higher than in FIG. 8 for the indoor case. Next consider the singular values for the authentic set of SV signals given in FIG. 11b. The non-dominant singular values are much larger relative to the dominant singular value for the authentic case than the spoofing case. This is the basis of forming the decision statistic of (20). The G(X) value is about zero.

Receiver Implementation

In the previous sections, it was shown how the synthetic array can be used to detect the presence of spoofing signals. This was based on quantifying, in some way, the spatial correlation of the channel gain associated with the various observable GNSS signals as the antenna was moved. There are various methods of doing this and these will be listed below. The outcome of these methods is a quantified measure of the likelihood that the set of GNSS signals observed is from a spoofing source versus from a set of authentic GNSS SV's. This quantified measure is compared to a threshold. If the threshold is exceeded then an alarm can be raised informing the GNSS user that the computed navigation solution is likely incorrect. The GNSS receiver can then conduct a search over a limited hypothesis space in order to reacquire the authentic GNSS signal, then re-compute the navigation solution and then apply spoofing detection to this new set of GNSS signals.

In one aspect of the invention, the GNSS receiver collects GNSS signals as the antenna is being translated, despreads the multiple GNSS signals, and records the complex valued channel gain as a function of time for all of the observable GNSS signals. Typically this would only extend to the set of GNSS signals that are currently tracked. After the jammer has successfully pulled the navigation tracking solution from the authentic solution, this will imply that only the spoofing jammer GNSS signals are part of the set. If the jammer is unsuccessful then the set will consist of the authentic SV signals. These tracked channel gains of the various GNSS signals are stored in memory. As the channel gain changes relatively slowly, the quantity of stored samples is not excessive.

The stored channel gain signals of the various GNSS signals mentioned above can then be used as inputs to the spoofing detector. The actual processing which may be done to determine whether spoofing is occurring is detailed below.

Pairs of channel gain signal sample sequences can be stored as a time sequence. And, as an output of the GNSS receiver, these pairs can be correlated resulting in a numerical estimation of the correlation coefficient as described above. The correlation coefficients can then be compared against a threshold. Exceeding this threshold would indicate that the pair of GNSS signals are likely sourced from a spoofer rather than an authentic pair of SV GNSS signals. An alarm can then be activated if the threshold is exceeded.

Alternatively to the above use of the pairs of channel gain signal sample sequences, entire set of channel gain sequences can be assembled into a data matrix denoted as X. In one implementation, the columns of X are the various sequences corresponding to the various despread GNSS signals. The singular value decomposition of X will result in a set of singular values and these singular values can be ordered in terms of decreasing amplitude. The decay rate of the singular values is determined and if this decay rate exceeds a given threshold then a spoofing source is likely. If the decay rate is less than a given threshold then the signals are likely from authentic GNSS SV's.

As a variant of the above, instead of computing the singular values, the eigenvalues of the matrix $XX^H$ can be computed where the superscript H denotes the Hermitian transpose.

A refinement to the above methods is that of considering the relative position of the GNSS SV's. This relative position is known assuming that the approximate time of day and location of the GNSS receiver is known. Based on this relative position, the bearings of some SV's are sufficiently close that their respective channel gains will be correlated to some known degree. This partial correlation can be taken into account when considering the methods above, especially when it comes to setting the threshold of the correlation coefficient to declare whether the incoming signals are authentic or not.

A further variant to the above methods involves, instead of using a hard decision thresholding of the numerical correlation coefficient as computed or the decay rate of the ordered singular or eigen values, these observables may be used as soft outputs which, combined with other sensor outputs, may be used to determine if a set of GNSS signals corresponds to a spoofer or authentic signals.

Another variant to detecting spoofing transmitters is that one may also use the differences between the signals received when an antenna is stationary and when an antenna is spatially translated. The user of the GNSS receiver may have the opportunity to stop the spatial translation or start it. That is the antenna of the GNSS receiver can be stationary or moved at a given velocity. When the antenna is stationary then the authentic channel gain signals will be highly correlated. The spoofer or inauthentic signals may also be highly correlated or may be less correlated due to random scintillation purposely used to modulate the spoofing signals. (One possible purpose for the deliberate scintillation is to reduce the correlation between signals.) With the stationary antenna, the methods described above work in reverse, i.e., lack of correlation amongst the GNSS signals is an indication that the source is a spoofing jammer as opposed to a set of authentic signals while increased correlation indicates authenticity of the source.

It should be noted that this phenomenon of a lack of correlation indicating a spoofing source may be used in conjunction with other input. One can seek a lack of correlation between the GNSS signals when the antenna is stationary and a higher degree of spatial correlation when the antenna is moving. Using ancillary sensors with the GNSS handset, the approximate velocity of translation of the antenna can be determined. The combined data collected of the approximate velocity of the antenna and the corresponding numerically calculated correlation of the tracked GNSS signals provide a more effective input to the spoofing detection to determine:
 if random scintillation is a probable component of the tracked GNSS signals
 if tracked GNSS signals have a higher degree of spatial correlation than expected (if they were indeed authentic)

The spoofing detection based on spatial correlation of the channel gains of the tracked GNSS signals or on the detection of a deliberate scintillation added to the tracked GNSS signals can be combined with other inputs to detect the presence of spoofing signals. Other inputs may be observations derived from the tracked navigation solution. Two possible inputs are the velocity and position of the tracked navigation solution—if the velocity and/or position are not within the reasonable bounds of credibility or are beyond predetermined bounds, then one may conclude that the signals used as from an inauthentic source.

As noted above, if an inauthentic source has been detected, and if the GNSS signals correspond to a spoofing jammer and not to a set of authentic SV signals, then an alarm may be generated, prompting the receiver to reacquire the authentic signals.

If an alarm is raised, based on the current track point of the spoofing signals, a limited search space (Doppler, code delay, SV code) can be set up such that the reacquisition can be efficiently accomplished.

Figure 12:
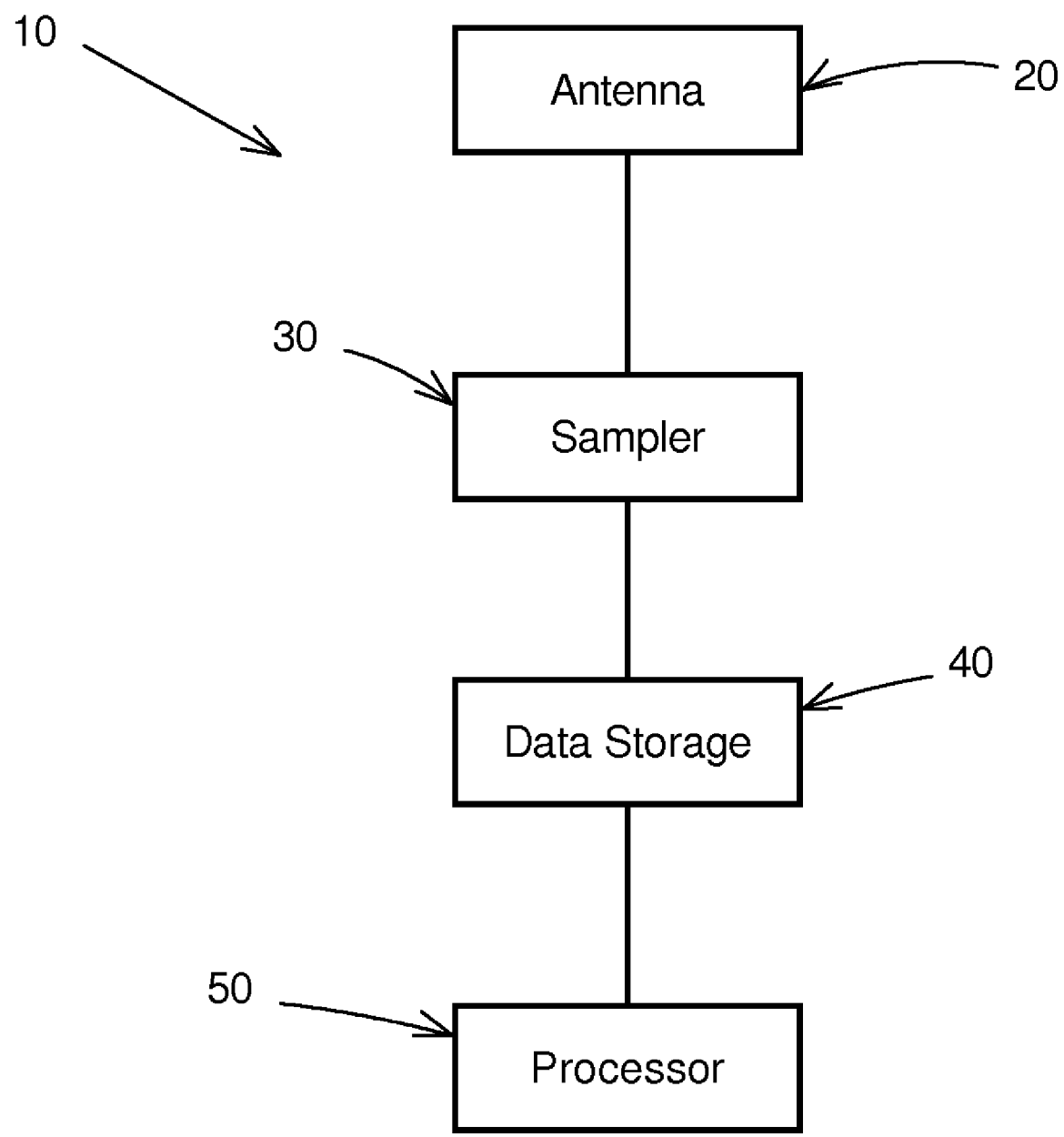
FIG. 12 is a block diagram illustrating the various subsystem blocks in a receiver system on which one aspect of the invention may be practiced.

Referring to FIG. 12, a block diagram of one aspect of the invention is illustrated. The system 10 gathers GNSS signal samples and determines whether the signal samples gathered are from an authentic GNSS source (e.g. an SV) or are from a spoofer/jammer transmitter. The system 10 has an antenna 20 which may be an array of antennas or it may be a single antenna which is spatially translated to form a synthetic antenna array. The antenna 20 is coupled to a signal sampler 30 which samples the GNSS signals received by way of the antenna 20. These samples are then stored in data storage 40 either as digital or analog signal samples for later processing. The samples are then processed by processor 50 that, as noted above, determines the spatial correlation of the channel gains between the samples to determine if the signals being sampled are from an inauthentic source or not. It should be noted that sampler 30 may be any suitable combinational digital or analog circuitry capable of sampling an analog or a digital signal received by way of the antenna 20. Data storage 40 may be any suitable digital storage circuitry useful for storing data. Processor 50 may be a general central processing unit or it may be a dedicated ASIC suitable for calculating the spatial correlation between the samples stored in data storage 40.

Figure 13:
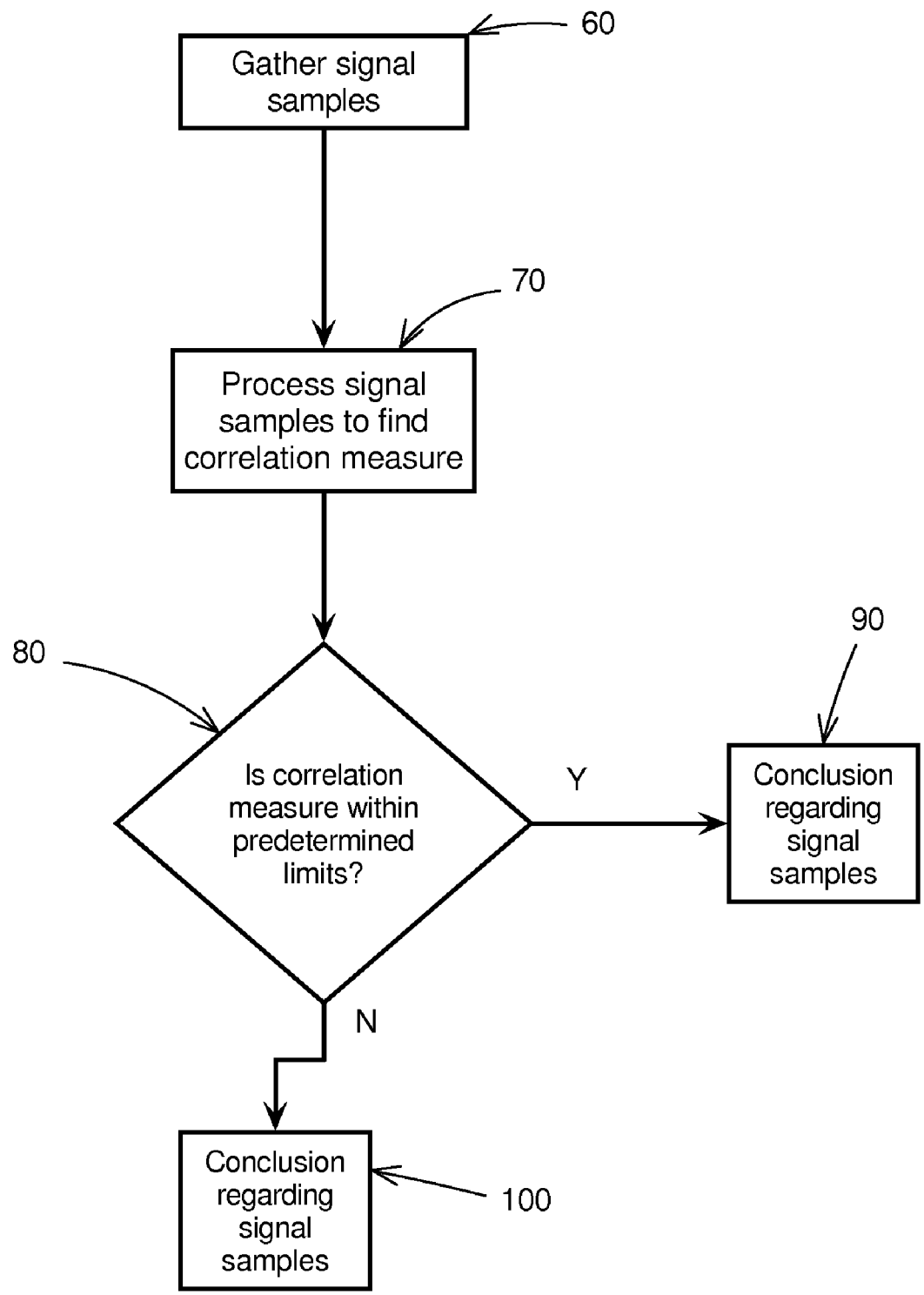
FIG. 13 is a flowchart illustrating the steps in a method according to another aspect of the invention.

Referring to FIG. 13, a flowchart illustrating the steps in a method according to one aspect of the invention is illustrated. The method begins with the gathering of the GNSS signal samples (step 60). This step may be done using either a synthetic antenna array or a multi-antenna array. Once the signal samples have been gathered, the samples are processed to determine the spatial correlation between the different signal samples (step 70). This processing may be done as outlined above using either singular value decomposition or numerical estimation. Once a measure of the correlation between the signals has been obtained, decision 80 is that of determining if the measure is within predetermined limits. Depending on the variant of the invention being implemented, as noted above, exceeding the predetermined limit may indicate an inauthentic source or an authentic source. Similarly, not meeting the predetermined limit may indicate an inauthentic or authentic source as the implementation details dictate.

While the above describes using spatial correlation between incoming signals to determine if an incoming GNSS signal is authentic or not, the invention described above may also be used in a broader context. If a number of signal sources from different bearings are transmitting, the invention may be used to discriminate between signals which are coming from the same bearing. As an example, if signals A1, A2, A3, B1, C1, D1, E1 are incoming and signals A1, A2, A3 are all coming from a single bearing, the above invention may be used to identify and isolate signals A1, A2, and A3 from the rest of the incoming signals. These signals may then be either focussed on and amplified or they may be filtered out and ignored. In one possible implementation, if signals are coming from a single terrestrial cellular base transmitter and from multiple satellite based transmitters, the signals from the terrestrial base transmitter can be discriminated and either isolated and amplified or isolated and filtered out.

It should be noted that the following references may be consulted for a better understanding of the issues addressed by the present invention. The following references are also hereby incorporated by reference.

REFERENCES

[1] Randolph G. Hartman, Spoofing Detection for a Satellite Positioning System, U.S. Pat. No. 5,557,284, issued 17 Sep. 1996.
[2] Charles E. McDowell, GPS Spoofer and Repeater Mitigation System using Digital Spatial Nulling, U.S. Pat. No. 7,250,903, 31 Jul. 2007.
[3] P. Montgomery, T. Humphreys, B. Ledvina, "A multi-antenna defense-receiver autonomous GPS spoofing detection," InsideGNSS March/April 2009, pp. 40-46
[4] Humphreys, T. E. B. Ledvina, M. Psaiki, B. Hanlon, P. Kintner "Assessing the spoofing threat: Develeopment of a portable GPS civilian spoofer," Proceedings of ION GNSS 2008, Institute of Naviagation, Savanna, Ga., USA, 2008
[5] S. Lo, D. DeLorenzo, P. Enge, D. Akos, P. Bradley, "Signal Authentification, a secure civil GNSS for today," inside GNSS September/October 2009, pp 30-39
[6] E. D. Kaplan, and C. Hegarty, *Understanding GPS Principles and Applications,* 2nd ed., Artech House 2006.
[7] H. L. V. Trees, *Optimum Array Processing, part IV, Detection, Estimation, and Modulation Theory*, John Wiley & Sons, Inc., New York, 2002.
[8] M. Skolnik, *Radar Handbook*, Third Edition, McGraw Hill 2008.
[9] A. Broumandan, J. Nielsen, and G. Lachapelle "Signal Detection Performance in Rayleigh Multipath Fading Environments with a Moving Antenna," *IET signal Processing Journal*, accepted for publication, May 2009.
[10] A. Broumandan, J. Nielsen, and G. Lachapelle "Performance of Narrowband Signal Detection under Correlated Rayleigh Fading based on Synthetic Array," *International Journal of Antennas and Propagation*, Volume 2009, Article ID 610109, 13 pages, doi: 10.1155/2009/610109.
[11] H. L. V. Trees, *Detection, Estimation, and Modulation Theory*, part I. John Wiley & Sons, Inc., New York, 2001.

Embodiments of the invention may be implemented in any conventional computer programming language For example, preferred embodiments may be implemented in a procedural programming language (e.g. "C") or an object oriented language (e.g. "C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A method for determining if incoming signals are from a single source, the method comprising:
    a) gathering a plurality of samples of said incoming signals
    b) determining a measure of spatial correlation between said samples gathered in step a)
    c) determining if said signals are originating from a single source based on said measure of said spatial correlation between said samples
    wherein said samples are gathered using at least one movable antenna and wherein said signals are determined as coming from a single source in the event said measure determined in step b) indicates a high spatial correlation between said samples when said at least one movable antenna is non-stationary.

2. A method according to claim 1 wherein step a) includes the step of despreading a channel gain as a function of time for each sample from said plurality of samples.

3. A method according to claim 1 wherein said signals are determined as coming from a single source when said measure determined in step b) indicates a low spatial correlation between said samples when said movable antenna is stationary.

4. A method according to claim 1 wherein step b) comprises dividing said samples into pairs of signal samples in a sequential manner and numerically estimating a correlation coefficient for each pair of signal samples.

5. A method according to claim 4 wherein each correlation coefficient determined for each pair of signal samples is compared to a predetermined threshold.

6. A method according to claim 5 wherein step c) comprises determining whether each correlation coefficient is greater than or less than said predetermined threshold.

7. A method according to claim 1 wherein step b) comprises:
    b1) organizing said plurality of samples into a data matrix
    b2) performing a singular value decomposition process on said data matrix to result in a plurality of singular values
    b3) arranging said singular values into an ordered set based on increasing or decreasing order
    b4) determining a rate of increase or decrease of said ordered set, said rate of increase or decrease being said measure of spatial correlation.

8. A method according to claim 7 wherein step c) comprises determining whether said rate of increase or decrease of said ordered set is greater than or less than a predetermined threshold.

9. A method according to claim 1 wherein step b) comprises:
    b1) organizing said plurality of samples into a data matrix
    b2) determining eigenvalues of at least one matrix derived from said data matrix to result in a plurality of values
    b3) arranging said values into an ordered set based on increasing or decreasing order
    b4) determining a rate of increase or decrease of said ordered set, said rate of increase or decrease being said measure of spatial correlation.

10. A method according to claim 9 wherein step c) comprises determining whether said rate of increase or decrease of said ordered set is greater than or less than a predetermined threshold.

11. A method according to claim 1 further including the step of generating an alarm in the event said signals are determined to be originating from a single source.

12. Computer readable media having encoded thereon computer readable instructions which, when executed, perform a method for determining if incoming signals are from a single source, the method comprising:
    a) gathering a plurality of samples of said incoming signals
    b) determining a measure of spatial correlation between said samples gathered in step a)
    c) determining if said signals are originating from a single source based on said measure of said spatial correlation between said samples
    wherein said samples are gathered using at least one movable antenna and wherein said signals are determined as coming from a single source in the event said measure determined in step b) indicates a high spatial correlation between said samples when said at least one movable antenna is non-stationary.

13. A system for determining if incoming signals are originating from a single source, the system comprising:
    at least one movable antenna
    signal sampler means coupled to said at least one antenna for sampling incoming signals received through said at least one antenna
    data storage means for storing signal samples sampled by said signal sampler means
    processor means for determining a spatial correlation between signal samples received through said at least one antenna
    wherein said samples are gathered using said at least one movable antenna and wherein said signals are determined as coming from a single source in the event said spatial correlation determined by said processor means indicates a high spatial correlation between said signal samples when said at least one movable antenna is non-stationary.

14. A system according to claim 13 wherein said at least one antenna is spatially translated while sampling said incoming signals to form a synthetic antenna array.

15. A method according to claim 1 wherein said incoming signals are GNSS (global navigation satellite system) signals.

16. A method according to claim 15 wherein said method is used to determine if incoming GNSS signals are originating from an inauthentic source such that in the event said incoming GNSS signals are originating from a single source, then said incoming GNSS signals are originating from an inauthentic source.

17. A system according to claim 13 wherein said incoming signals are GNSS (global navigation satellite system) signals.

18. A system according to claim 17 wherein said system is used to determine if incoming GNSS signals are originating from an inauthentic source such that in the event said incoming GNSS signals are originating from a single source, then said incoming GNSS signals are originating from an inauthentic source.

* * * * *